(12) United States Patent
Sip et al.

(10) Patent No.: US 8,155,713 B2
(45) Date of Patent: Apr. 10, 2012

(54) MOBILE PHONE HAVING COMMUNICATION SYSTEM AND ENTERTAINMENT SYSTEM DETACHABLY CONNECTED TO THE COMMUNICATION SYSTEM

(75) Inventors: Kim-Yeung Sip, Shenzhen (CN); Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 428 days.

(21) Appl. No.: 12/428,480

(22) Filed: Apr. 23, 2009

(65) Prior Publication Data

US 2010/0160005 A1 Jun. 24, 2010

(30) Foreign Application Priority Data

Dec. 22, 2008 (CN) .......................... 2008 1 0306411

(51) Int. Cl.
*H04M 1/00* (2006.01)
(52) U.S. Cl. .................................. 455/575.1; 455/575.4
(58) Field of Classification Search ............... 455/575.1, 455/575.2, 90.2, 90.3, 575.3, 575.4
See application file for complete search history.

(56) References Cited

U.S. PATENT DOCUMENTS

| | | | | |
|---|---|---|---|---|
| 7,656,675 | B2 * | 2/2010 | Kim et al. | 361/752 |
| 7,692,717 | B2 * | 4/2010 | Yoo et al. | 348/373 |
| 7,778,673 | B2 * | 8/2010 | Zhu | 455/566 |
| 2006/0148544 | A1 * | 7/2006 | Kim | 455/575.4 |
| 2008/0182634 | A1 * | 7/2008 | Cho et al. | 455/575.4 |
| 2009/0137280 | A1 * | 5/2009 | Heikkinen et al. | 455/566 |
| 2009/0247235 | A1 * | 10/2009 | Okano | 455/566 |
| 2010/0144408 | A1 * | 6/2010 | Chuang et al. | 455/575.4 |
| 2010/0240425 | A1 * | 9/2010 | Madsen et al. | 455/575.4 |

FOREIGN PATENT DOCUMENTS

| | | |
|---|---|---|
| CN | 101102561 A | 1/2008 |
| CN | 201018556 Y | 2/2008 |
| CN | 101141716 A | 3/2008 |

* cited by examiner

*Primary Examiner* — Peguy Jean Pierre
(74) *Attorney, Agent, or Firm* — Altis Law Group, Inc.

(57) ABSTRACT

A mobile phone is disclosed. The mobile phone includes a communication system and an entertainment system. The communication system can independently provide communication function. The entertainment system can independently provide various entertainment functions. Each system includes two magnetic elements to allow them detachably connect them together. Each system also includes a connector to form an electrical connection between the communication system and the entertainment system when the systems are combined.

18 Claims, 5 Drawing Sheets

MOBILE PHONE HAVING COMMUNICATION SYSTEM AND ENTERTAINMENT SYSTEM DETACHABLY CONNECTED TO THE COMMUNICATION SYSTEM

BACKGROUND

1. Technical Field

The disclosure relates to a mobile phone.

2. Description of Related Art

Current mobile phones typically include a core system for providing basic wireless service and additional systems for providing additional functions, e.g., reading, gaming, and reproducing music/video. For faster access, these additional systems are typically being supplied with power even when they are not being used, thus draining the battery. In addition, the core system keeps generating radio signal when connected to the power source. This is harmful to users.

Therefore, it is desirable to provide a mobile phone, which can overcome the above-mentioned problems.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
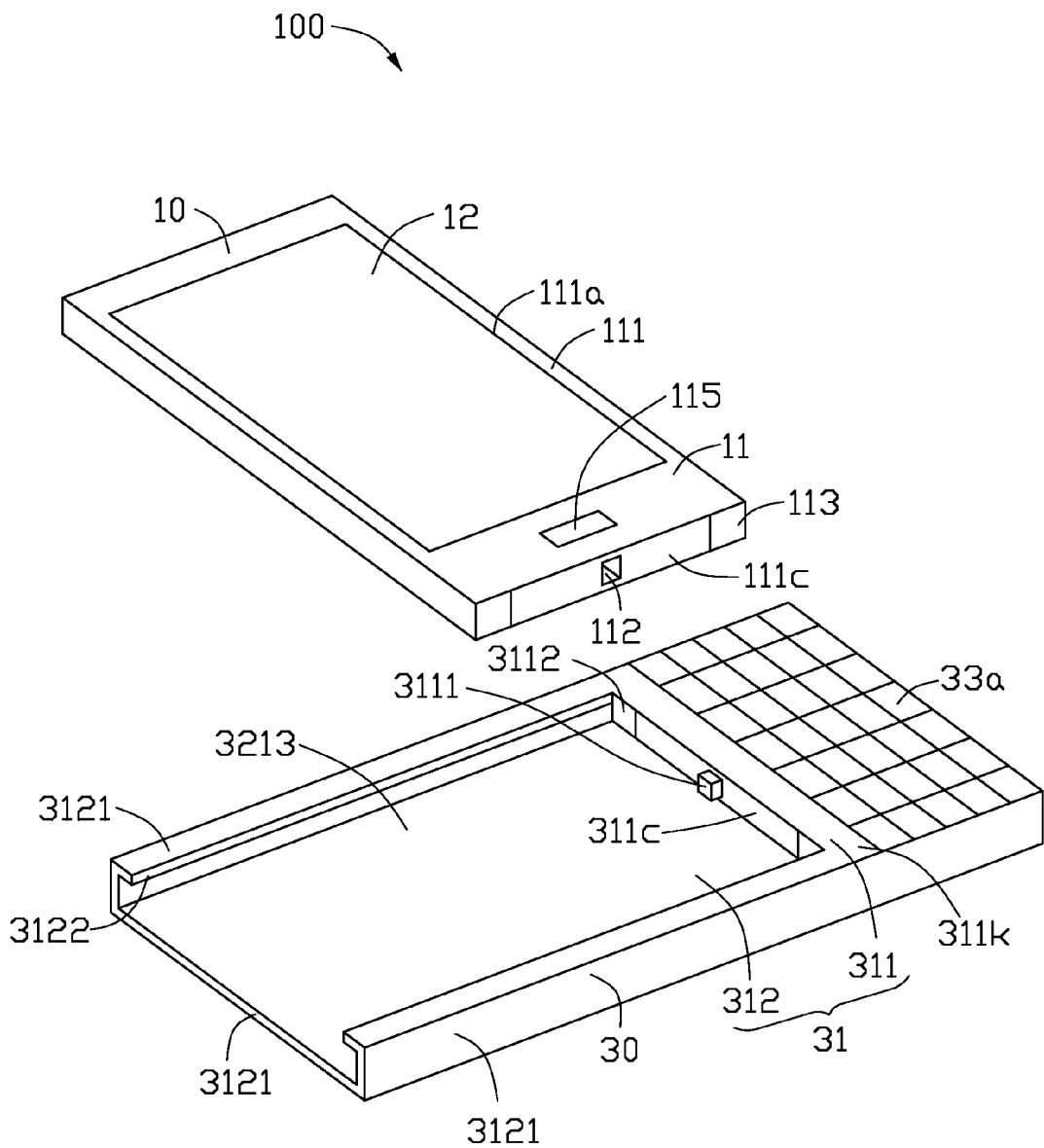
FIG. 1 is an isometric, schematic view of a mobile phone which is in a first operation state, according to an exemplary embodiment.
Figure 2:
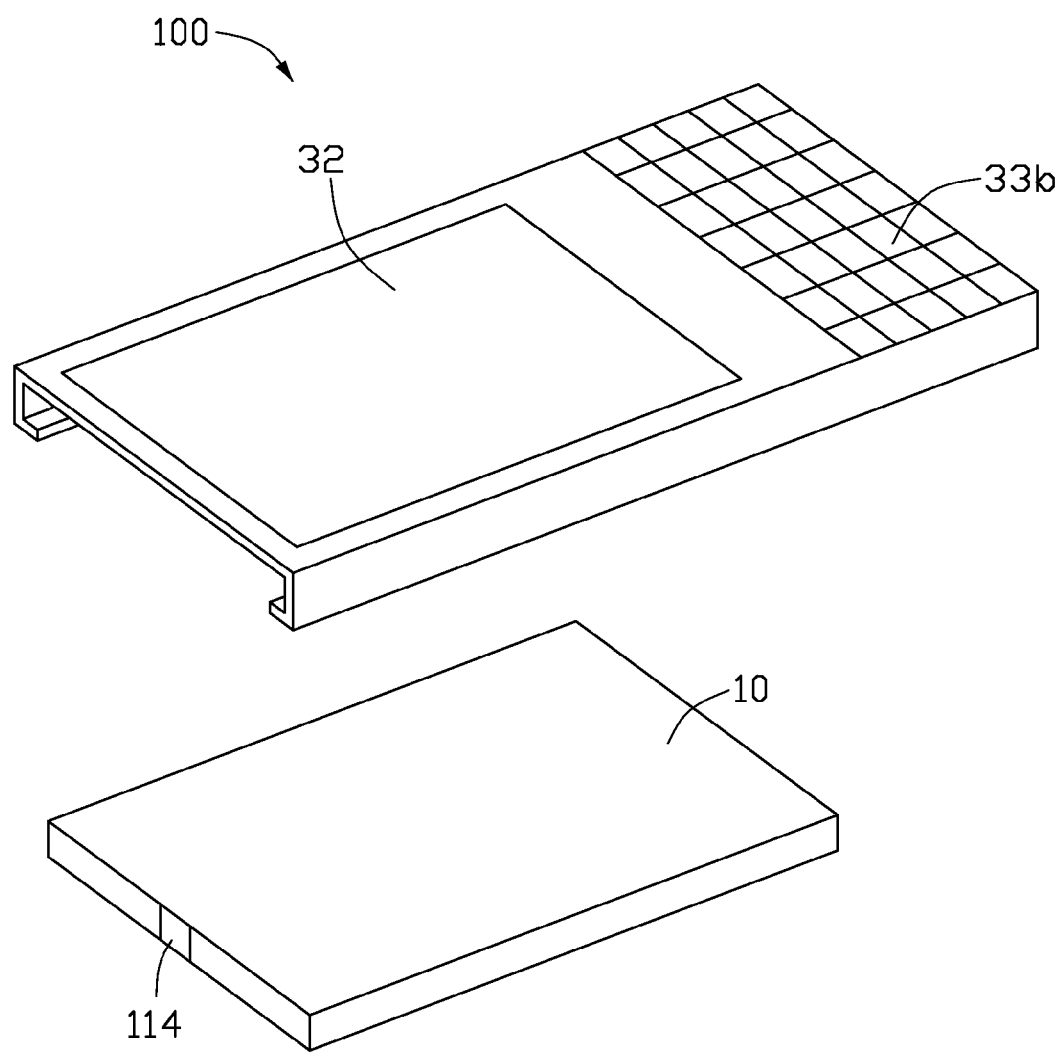
FIG. 2 is similar to FIG. 1, but showing the mobile phone at another view angle.

Referring to FIGS. 1-2, a mobile phone 100, according to an exemplary embodiment, is illustrated. The mobile phone 100 includes a communication system 10 and an entertainment system 30. The communication system 10 can independently provide radio-based communication function. The entertainment system 30 can independently provide various entertainment functions, e.g., reading, gaming, reproducing music/video.

Figure 3:
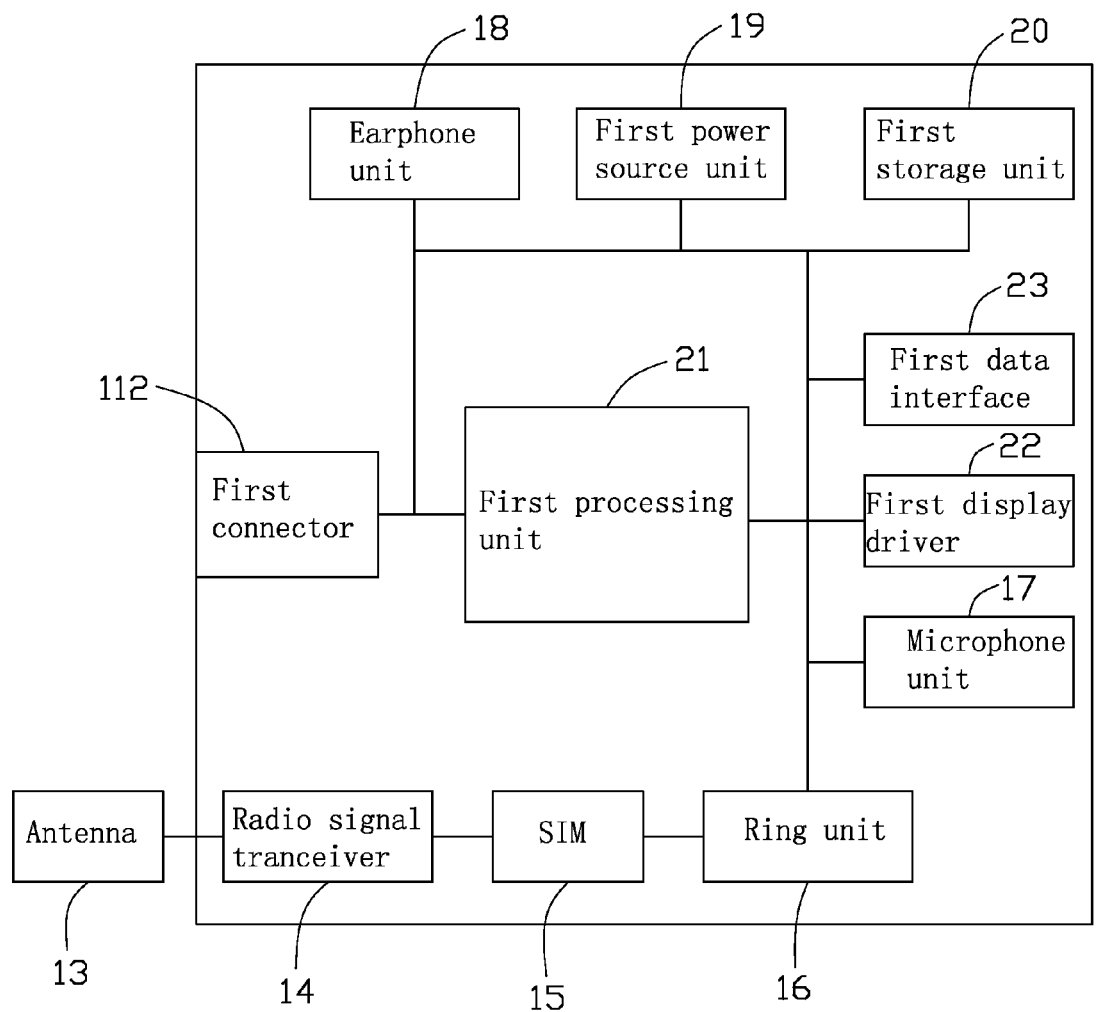
FIG. 3 is a functional block diagram of a communication system of the mobile phone of FIG. 1.

Also referring to FIG. 3, the communication system 10 includes a first shell 11, a first display 12, an antenna 13, a radio signal transceiver 14, a subscriber identity module (SIM) 15, a ring unit 16, a microphone unit 17, an earphone unit 18, a first power source unit 19, a first storage unit 20, a first processing unit 21, a first display driver 22, a first data interface 23, a first connector 112, two first magnetic elements 113, a power switch 114, and an antenna switch 115. The first display 12, the antenna 13, the radio signal transceiver 14, the SIM 15, the ring unit 16, the microphone unit 17, the earphone unit 18, the first power source unit 19, the first storage unit 20, the first processing unit 21, the first display driver 22, the first data interface 23, the first connector 112, the two first magnetic elements 113, the power switch 114, and the antenna switch 115 are assembled, e.g., accommodated or mounted, into the first shell 11.

The first shell 11 is a hollow cuboid in shape. The first shell 11 includes a display surface 111 and a first connecting surface 111c adjacent to the display surface 111. The first shell 11 defines a display opening 111a in the display surface 111.

In this embodiment, the first display 12 is a light emitting diode (LED) display and is accommodated within the first shell 11 with its screen exposed to the outside via the display opening 111a. It should be mentioned that the first display 12 is not limited to this embodiment, but can be other type of display device, such as a liquid crystal display (LCD).

The antenna 13, the radio signal transceiver 14, and the SIM 15 constitute a communication core system, which allows the mobile phone 100 to transmit and receive radio signals from a communication network, providing basic communication function for the mobile phone 100.

The ring unit 16, the microphone unit 17, and the earphone unit 18 constitute a communication enclosure system, which completes communication function of the mobile phone 100.

The first power source unit 19 is configured for supplying power to all electrical components of the communication system 10, such as the first display 12, the antenna 13, the radio signal transceiver 14, the SIM 15, the ring unit 16, the microphone unit 17, the earphone unit 18, the first storage unit 20, the first processing unit 21, the first display driver 22, and the first data interface 23.

The first storage unit 20 is configured for storing information generated by the information-generating components of the communication system 10 such as the radio signal transceiver 14, the SIM 15, the first processing unit 21, the first display driver 22, and the first data interface 23.

The first processing unit 21 is configured for processing information for the communication system 10.

The first display driver 22 is configured for driving the first display 12.

The first data interface 23 is configured for transmitting and receiving data for the communication system 10.

The first connector 112, such as a jack (i.e., a female connector), is positioned on the center of the first connecting surface 111c and is electrically connected to the electrical components of the communication system 10 such as the first display 12, the antenna 13, the radio signal transceiver 14, the SIM 15, the ring unit 16, the microphone unit 17, the earphone unit 18, the first power source unit 19, the first storage unit 20, the first processing unit 21, the first display driver 22, and the first data interface 23.

The two first magnetic elements 113 are embedded in two end of the first connecting surface 111c.

The power switch 114 is configured for controlling power supply of the communication system 10, i.e., controlling connection or disconnection between the first power source unit 19 and the electrical components of the communication system 10 which are powered by the first power source unit 19 (see above). Therefore, the communication system 10 can be powered on/off independently, regardless of whether connected to the entertainment system 30 or not. That is, the communication system 10 can work independently.

In this embodiment, the power switch 114 is disposed on a surface of the first shell 11 opposite to the first connecting surface 111c. However, the position of the power switch 114 should not be limited to this embodiment, but depends on design needs.

The antenna switch 115 is configured for activating and deactivating the antenna 13. Thereby, communication function of the communication system 10 that is harmful to users can be shut off but can be quickly retrieved using the antenna switch 115.

In this embodiment, the antenna switch 115 is disposed on the display surface 111. However, the position of the antenna switch 115 should not be limited to this embodiment, but depends on design needs.

Figure 4:
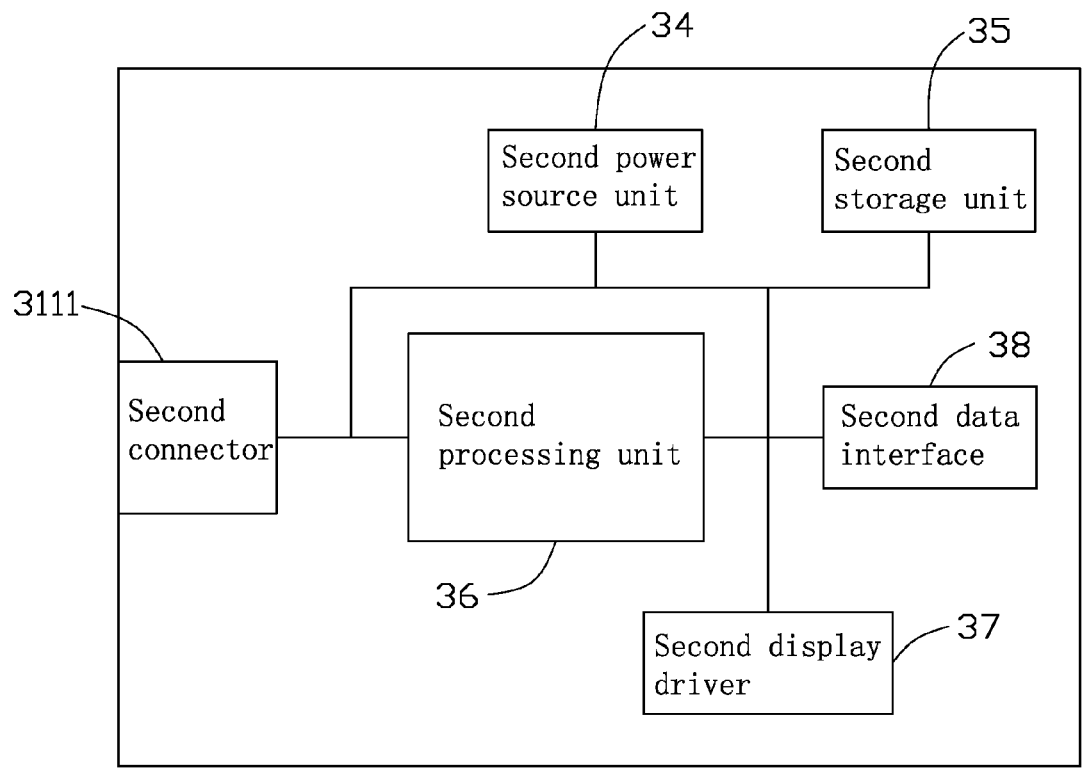
FIG. 4 is a functional block diagram of an entertainment system of the mobile phone of FIG. 1.

Also referring to FIG. 4, the entertainment system 30 includes a second shell 31, a second display 32, two keypads 33a, 33b, a second power source unit 34, a second storage unit 35, a second processing unit 36, a second display driver 37, a second data interface 38, a second connector 3111, and two second magnetic elements 3112.

The second shell 31 includes a keypad segment 311 and a display segment 312.

The keypad segment 311 is a hollow block in shape. The second display 32, the keypads 33a, 33b, the second power source unit 34, the second storage unit 35, the second processing unit 36, the second display driver 37, the second data interface 38, the second connector 3111, the two second magnetic elements 3112 are assembled, e.g., accommodated or mounted, into the keypad segment 311. The keypad segment 311 includes a main keypad surface 311k and a second connecting surface 311c.

The display segment 312 includes walls 3121 which extend upwards from the edges of the second connecting surface 311c. One of the walls 3121 that extends from the edge of the second connecting surface 311c adjacent to the main keypad surface 311k defines an opening 3122. As such, the walls 3121 define an open receiving space 3213.

The second display 32 is an electronic paper which is capable of holding text and images indefinitely without drawing electricity, and is pasted on an outer surface of the display segment 312 opposite to the main keypad surface 311k.

The keypad 33a is disposed on the main keypad surface 311k. The keypad 33b is disposed on the surface on which the second display 32 is disposed. The keypad 33a on the main keypad surface 311k is used for the first display 12. The keypad 33b is used for the second display 32.

The second power source unit 34 is configured for supplying power for all electrical components of the entertainment system 30. The second storage unit 35 is configured for storing information generated by the information-generating components of the entertainment system 30. The second processing unit 36 is configured for processing information for the entertainment system 30. The second display driver 37 is configured for driving the second display 32. The second data interface 38 is configured for transmitting and receiving data for the entertainment system 30.

The second connector 3111, such as a plug (i.e., a female connector), is electrically connected to the electrical components of the entertainment system 30, such as the second display 32, the keypads 33a, 33b, the second power source unit 34, the second storage unit 35, the second processing unit 36, the second display driver 37, and the second data interface 38.

In this embodiment, the second connector 3111 protrudes outward from the center of the second connecting surface 311c. Each second magnetic element 3112 is embedded in a corner of the second connecting surface 311c. However, it should be understood that the positions of the second connector 3111 and the second magnetic elements 3112 are not limited to this embodiment, but depends on design needs.

Figure 5:
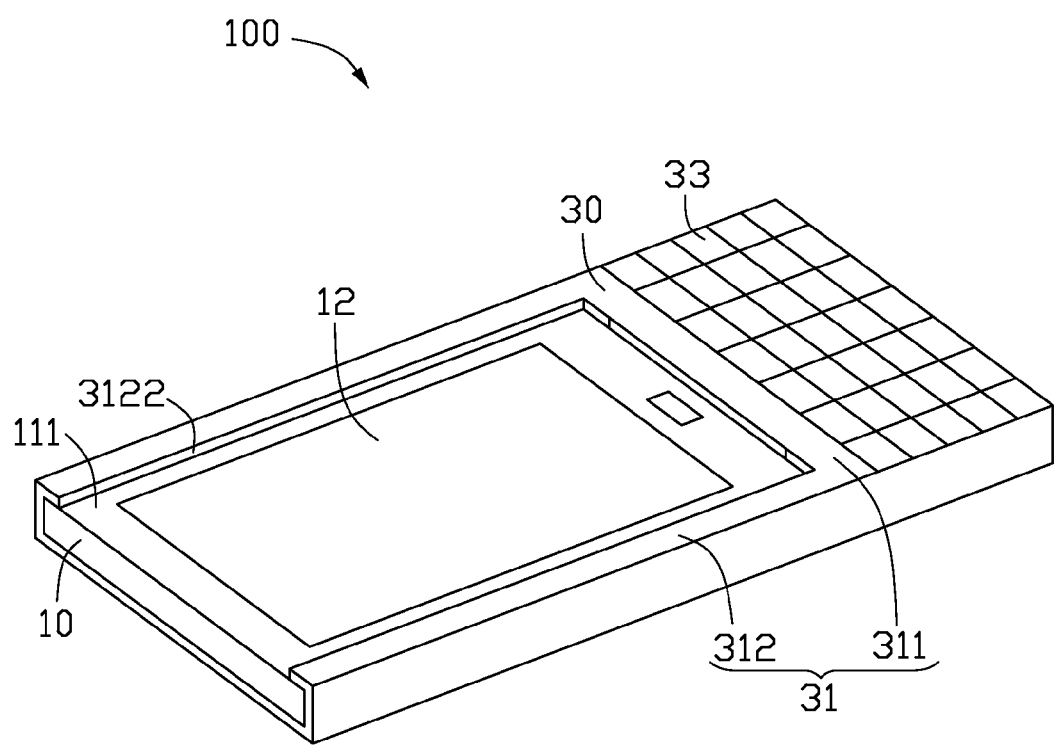
FIG. 5 is an isometric, schematic view of the mobile phone of FIG. 1 which is in a second operation state.

Referring to FIG. 5, in use, if all the functions of the mobile phone 100 are desired, the communication system 10 and the entertainment system 30 are combined by inserting the communication system 10 into the open receiving space 3213. In combination, the display surface 111 is exposed to the outside via the opening 3122 to form a communication interface. The second connector 3111 plugs into the first connector 112 to electrically connect the communication system 10 and the entertainment system 30, and the first magnetic element 113 and the second magnetic element 3112 attract each other to hold the communication system 10 and the entertainment system 30 together.

It should be mentioned that one of the first power source unit 19 and the second power source unit 34 can be a primary power source of the mobile phone 100 and the other is a secondary power source. In combination, the secondary power source can be powered off and all the communication system 10 and the entertainment system 30 draw electricity from the primary power source using an electrical channel established by the first connector 112 and the second connector 3111.

When connected, the first connector 112 and the second connector 3111 also provide data transmission for the communication system 10 and the entertainment system 30.

The first connector 112 and the second connector 3111 are not limited to the above-described embodiments. Other types of connector can be used, such as USB.

It should be mentioned that the number of the first magnetic elements 113 and the second magnetic elements 3112 are not limited to two, but can one or more than two in other alternative embodiments. Further, the combination manner of the communication system 10 and the entertainment system 30 is not limited to this embodiment. In other alternative embodiment, mating/fitting engagement structures can be used.

While the disclosure has been described by way of example and in terms of exemplary embodiments, it is to be understood that the disclosure is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile phone comprising:
   an entertainment system capable of independently providing various entertainment functions and comprising a first shell, the first shell comprising:
   a keypad segment being block-shaped and comprising a first connecting surface, the first connecting surface comprising a plurality of edges; and
   a display segment comprising a plurality of walls extending from the edges of the first connecting surface, thereby defining an open receiving space;
   a communication system capable of independently providing radio-based communication function and being received in the receiving space, the communication system comprising a second shell, the second shell comprising a second connecting surface in contact with the first connecting surface;
   a first magnetic element formed on the first connecting surface;
   a second magnetic element formed on the second connecting surface, the first magnetic element and the second magnetic element being configured for attracting each other to detachably connect the entertainment system and the communication system;
   a first connector disposed on the first connecting surface; and
   a second connector disposed on the second connecting surface; the first connector and the second connector being electrically coupled with each other to establish an electrical connection between the communication system and the entertainment system.

2. The mobile phone as claimed in claim 1, wherein the keypad segment comprises a main keypad surface adjacent to the first connecting surface, one of the walls of the display segment extending from the intersection edge of the first connecting surface and the main keypad surface defines an opening therein, and the communication system comprises a display surface adjacent to the second connecting surface and is exposed to the outside via the opening.

3. The mobile phone as claimed in claim 2, wherein the keypad segment comprises a keypad disposed on the main keypad surface.

4. The mobile phone as claimed in claim 2, wherein the entertainment system comprises a display disposed on a surface opposite to the main keypad surface.

5. The mobile phone as claimed in claim 4, wherein the keypad segment comprises a keypad disposed on the main keypad surface.

6. The mobile phone as claimed in claim 4, wherein the display is an electronic paper.

7. The mobile phone as claimed in claim 4, wherein the entertainment system comprises a display driver for driving the display.

8. The mobile phone as claimed in claim 2, wherein the communication system comprises a display, the display surface defines a display opening, and the display is embedded in the first shell and exposed to the outside via the display opening.

9. The mobile phone as claimed in claim 8, wherein the communication system comprises a display driver for driving the display.

10. The mobile phone as claimed in claim 1, wherein the entertainment system comprises a power source unit for supplying power to the entertainment system.

11. The mobile phone as claimed in claim 1, wherein the entertainment system comprises a storage unit, a processing unit, and a data interface, the storage unit is configured for storing information generated by the entertainment system, the processing unit is configured for processing information for the entertainment system, and the data interface is configured for transmitting and receiving data for the entertainment system.

12. The mobile phone as claimed in claim 1, wherein the communication system comprises a power source unit for supplying power to the communication system.

13. The mobile phone as claimed in claim 12, wherein the communication system comprises a power switch for switching the power source unit on and off.

14. The mobile phone as claimed in claim 1, wherein the communication system comprises an antenna for generating and receiving radio signals.

15. The mobile phone as claimed in claim 14, wherein the communication system comprises an antenna switch for activating and deactivating the antenna.

16. The mobile phone as claimed in claim 14, wherein the communication system comprises a radio signal transceiver, and a subscriber identity module; and the antenna, the radio signal transceiver, and the subscriber identity module constitute a communication core system for allowing the mobile phone to transmit and receive radio signals from a communication network.

17. The mobile phone as claimed in claim 16, wherein the communication system comprises a ring unit, a microphone unit, and an earphone unit which constitute a communication enclosure system for completing the communication function of the mobile phone.

18. The mobile phone as claimed in claim 1, wherein the communication system comprises a storage unit, a processing unit, and a data interface, the storage unit is configured for storing information generated by the communication system, the processing unit is configured for processing information for the communication system, and the data interface is configured for transmitting and receiving data for the communication system.

* * * * *